(12) United States Patent
Dudar (10) Patent No.: US 10,818,189 B2
(45) Date of Patent: Oct. 27, 2020

(54) PLATOONING VEHICLE ORDER

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 238 days.

(21) Appl. No.: 15/663,949

(22) Filed: Jul. 31, 2017

(65) Prior Publication Data

US 2019/0035283 A1   Jan. 31, 2019

(51) Int. Cl.
| G08G 1/00 | (2006.01) |
| G05D 1/02 | (2020.01) |
| G05D 1/00 | (2006.01) |
| G08G 1/16 | (2006.01) |

(52) U.S. Cl.
CPC ............. G08G 1/22 (2013.01); G05D 1/0295 (2013.01); *G05D 1/0027* (2013.01); *G05D 1/0212* (2013.01); *G05D 1/0293* (2013.01); *G08G 1/164* (2013.01)

(58) Field of Classification Search
CPC .. G05D 1/0295; G05D 1/0293; G05D 1/0027; G05D 1/0212; G08G 1/22; G08G 1/154
USPC ........... 701/23, 24, 32.7, 300, 117; 342/458; 340/435
See application file for complete search history.

(56) References Cited

U.S. PATENT DOCUMENTS

| 8,352,111 | B2* | 1/2013 | Mudalige | G08G 1/163 |
| | | | | 701/24 |
| 8,352,112 | B2* | 1/2013 | Mudalige | G08G 1/164 |
| | | | | 701/24 |
| 8,676,466 | B2* | 3/2014 | Mudalige | G08G 1/163 |
| | | | | 701/93 |
| 9,037,389 | B2* | 5/2015 | You | G08G 1/22 |
| | | | | 701/117 |
| 9,396,661 | B2 | 7/2016 | Okamoto | |
| 9,550,137 | B2 | 1/2017 | Fontecchio | |
| 10,429,855 | B1* | 10/2019 | Reinhart | G05D 1/0295 |
| 10,579,072 | B2* | 3/2020 | Yang | G08G 1/0962 |
| 10,719,084 | B2* | 7/2020 | Yoon | H04L 43/08 |
| 10,723,370 | B1* | 7/2020 | Heaton | B61D 15/00 |

(Continued)

FOREIGN PATENT DOCUMENTS

| CN | 105109478 A | 12/2015 |
| KR | 1020140098541 A | 8/2014 |

OTHER PUBLICATIONS

Decentralized Longitudinal Tracking Control for Cooperative Adaptive Cruise Control Systems in a Platoon; Shi-Yuan Han et al.; 2013 IEEE International Conference on Systems, Man, and Cybernetics; pp. 2013-2018; year 2013.*

(Continued)

*Primary Examiner* — Cuong H Nguyen
(74) *Attorney, Agent, or Firm* — Frank A. MacKenzie; Bejin Bieneman PLC (57) ABSTRACT

A vehicle computer includes a memory and a processor programmed to execute instructions stored in the memory. The instructions include determining whether to operate a host vehicle in a mini-platoon based at least in part on at least one of a powertrain type and emissions of at least one of a plurality of nearby vehicles.

17 Claims, 3 Drawing Sheets

(56) References Cited

U.S. PATENT DOCUMENTS

| | | | |
|---|---|---|---|
| 2010/0065344 A1* | 3/2010 | Collings, III | B60L 53/11 180/2.1 |
| 2010/0256836 A1* | 10/2010 | Mudalige | G08G 1/164 701/2 |
| 2010/0256852 A1* | 10/2010 | Mudalige | G08G 1/22 701/24 |
| 2011/0191265 A1* | 8/2011 | Lowenthal | B60L 3/12 705/412 |
| 2012/0197693 A1* | 8/2012 | Karner | G06Q 20/102 705/14.1 |
| 2013/0046427 A1* | 2/2013 | Hohenberg | B60K 6/365 701/22 |
| 2014/0316865 A1* | 10/2014 | Okamoto | G08G 1/22 705/14.1 |
| 2015/0285112 A1 | 10/2015 | Mathiasson et al. | |
| 2016/0054735 A1* | 2/2016 | Switkes | G08G 1/22 701/23 |
| 2017/0351261 A1* | 12/2017 | Levinson | G01S 17/42 |
| 2017/0369067 A1* | 12/2017 | Saigusa | B60W 30/18163 |
| 2018/0027600 A1* | 1/2018 | Lawlis | H04L 9/0825 713/168 |
| 2018/0047293 A1* | 2/2018 | Dudar | B60W 30/165 |
| 2018/0107216 A1* | 4/2018 | Beaurepaire | G06Q 30/0261 |

OTHER PUBLICATIONS

Cooperative Automated Maneuvering at the 2016 Grand Cooperative Driving Challenge; Jeroen Ploeg et al.; IEEE Transactions on Intelligent Transportation Systems; vol. 19, Issue: 4; pp. 1213-1226; IEEE Journals & Magazines; Year: 2018.*

Decentralized longitudinal tracking control for Cooperative Adaptive Cruise Control systems based on multiple V2V communication Q. Sun et al.; 2016 20th International Conf. on System Theory, Control and Computing (ICSTCC); IEEE Conf.; pp. 29-34; year 2016.*

Survey and Classification of Cooperative Automated Driver Assistance Systems; Oliver Sawade et al.; 2015 IEEE 82nd Vehicular Technology Conference (VTC2015-Fall); pp. 1-5; IEEE Conferences; year 2015.*

Modeling and Robust Control of Heterogeneous Vehicle Platoons on Curved Roads Subject to Disturbances and Delays Liwei Xu ; Weichao Zhuang ; Guodong Yin ; Chentong Bian ; Huawei Wu; IEEE Transactions on Vehicular Technology; vol. 68, Issue: 12. (Year: 2019).*

Joint Radio Resource Allocation and Control for Vehicle Platooning in LTE-V2V Network; Jie Mei ; Kan Zheng ; Long Zhao ; Lei Lei ; Xianbin Wang; IEEE Transactions on Vehicular Technology; vol. 67, Issue: 12 (Year: 2018).*

Distributed Deception Attack Detection in Platoon-Based Connected Vehicle Systems; Zhiyang Ju ; Hui Zhang ; Ying Tan, IEEE Transactions on Vehicular Technology; vol. 69, Issue: 5. (Year: 2020).*

Platooning Maneuvers in Vehicular Networks: A Distributed and Consensus-Based Approach; Stefania Santini ; Alessandro Salvi ; Antonio Saverio Valente ; Antonio Pescapè ; Michele Segata ; Renato Lo Cigno; IEEE Transactions on Intelligent Vehicles; vol. 4, Issue: 1 (Year: 2019).*

Cooperative Look-Ahead Control for Fuel-Efficient and Safe Heavy-Duty Vehicle Platooning; Valerio Turri ; Bart Besselink ; Karl H. Johansson; IEEE Transactions on Control Systems Technology; vol. 25, Issue: 1 (Year: 2017).*

Dynamics Platooning Model and Protocols for Self-Driving Vehicles; Amr Farag ; Ahmed Hussein ; Omar M. Shehata ; Fernando García ; Hadj Hamma Tadjine ; Elmar Matthes; 2019 IEEE Intelligent Vehicles Symposium (IV) (Year: 201).*

Multiple-Lane Vehicle Platooning based on a Multi-Agent Distributed Model Predictive Control Strategy; Constantin F. Caruntu ; Anca Maxim ; Razvan C. Rafaila; 2018 22nd International Conference on System Theory, Control and Computing (ICSTCC); IEEE Conference Paper (Year: 2018).*

* cited by examiner

PLATOONING VEHICLE ORDER

BACKGROUND

At a high level, a vehicle platoon is when a group of vehicles follow one another. The lead vehicle is controlled by a human driver or a virtual driver (i.e., in an autonomous mode). The remaining vehicles in the platoon operate in an autonomous or partially autonomous mode to follow the route of the lead vehicle in tandem. Benefits of platooning include greater fuel economy resulting from reduced air resistance, reduced traffic congestion, etc.

DETAILED DESCRIPTION

Platooning vehicles may remain in the platoon for as long as necessary. During longer trips, the order of the platoon does not change. This may cause discomfort to certain passengers if, e.g., the vehicle with passengers is behind a vehicle giving off certain odors for a long period of time. Such vehicles may degrade the air quality in other nearby vehicles. For example, passengers of a platooning vehicle may not wish to be in a platoon immediately behind a garbage truck, a vehicle with a rich-running gasoline engine, a vehicle with a diesel engine, a vehicle emitting a disproportionate amount of smoke, a vehicle with a heavy smoker, a vehicle transporting animals, a vehicle transporting mulch or fertilizer, etc.

One solution includes incorporating a platooning system, into vehicles, that group platooning vehicles into mini-platoons by powertrain type, vehicle emissions, vehicle size, etc. The platooning system may be implemented via a vehicle computer including a memory and a processor programmed to execute instructions stored in the memory. The instructions include determining whether to operate a host vehicle in a mini-platoon based at least in part on at least one of a powertrain type and emissions of at least one of a plurality of nearby vehicles.

The processor may be programmed to determine a location of the host vehicle in the mini-platoon relative to at least one of the plurality of nearby vehicles. The location may be based at least in part on at least one of a size and class of the host vehicle and at least one of a size and class of at least one of the plurality of nearby vehicles. The vehicle computer may further include a communication transceiver programmed to receive data from the nearby vehicles. The data may include at least one of the sizes and classes of the nearby vehicles. The data may further include at least one of the powertrain type and emissions of the at least one of the plurality of nearby vehicles.

In some possible approaches, the processor may be programmed to determine whether the host vehicle has at least one passenger. In this instance, the processor may be programmed to determine whether the host vehicle has at least one passenger based on signals output by an occupant detection system.

The vehicle computer may further include an autonomous vehicle controller programmed to autonomously operate the host vehicle in the mini-platoon.

A method may include receiving data from a nearby vehicle, detecting the nearby vehicle has at least one of a powertrain type and emissions similar to a powertrain type and emissions of a host vehicle, and operating the host vehicle in a mini-platoon with the nearby vehicle after determining that the nearby vehicle has at least one of the powertrain type and emissions similar to the powertrain type and emissions of the host vehicle.

The method may further include determining a location of the host vehicle in the mini-platoon relative to the nearby vehicle. In this instance, the location may be based at least in part on at least one of a size and class of the host vehicle and at least one of a size and class of the nearby vehicle. Further, the data received from the nearby vehicle may include at least one of the size and class of the nearby vehicle. The data may further include at least one of the powertrain type and emissions of the nearby vehicle.

In some instances, the method may include determining that the host vehicle has at least one passenger. Determining that the host vehicle has at least one passenger may include receiving a signal output by an occupant detection system and determining that the host vehicle has at least one passenger by processing the signal output by the occupant detection system. Operating the host vehicle in a mini-platoon with the nearby vehicle may occur after determining that the host vehicle has at least one passenger. Determining that the nearby vehicle has at least one of the powertrain type and emissions similar to the powertrain type and emissions of the host vehicle may occur after determining that the host vehicle has at least one passenger.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
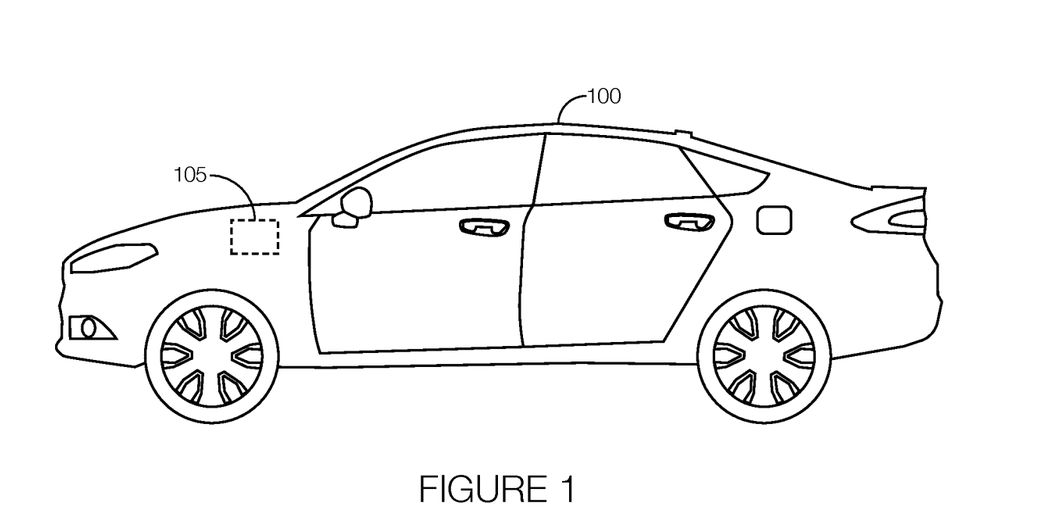
FIG. 1 illustrates an example host vehicle with a platooning system that controls the host vehicle to order itself in a vehicle platoon based on various factors.

As illustrated in FIG. 1, the host vehicle 100 includes a platooning system 105, implemented via a vehicle computer, that positions the host vehicle 100 in a platoon at particular locations relative to other platooning vehicles. Specifically, the platooning system 105 attempts to establish mini-platoons of vehicles with similar powertrain types. Vehicles with similar powertrain types will have similar emissions. Grouping vehicles by powertrain types, and therefore by emissions, will make traveling in a platoon more comfortable for passengers of the vehicles in the platoon. As such, the platooning system 105 identifies vehicles with a similar powertrain to that of the host vehicle 100 and commands the host vehicle 100 to enter the platoon near those similar vehicles.

The platooning system 105 commands the host vehicle 100 to enter the platoon in an order based on the size or classification of the host vehicle 100 with a preference for smaller vehicles to be in front of larger vehicles. Thus, the mini-platoon created by the platooning systems 105 of the vehicles in the platoon, including the platooning system 105 of the host vehicle 100, will include vehicles with similar powertrain types and in increasing order of vehicle size (i.e., smaller cars near the front of the mini-platoon and larger trucks near the back of the mini-platoon) to increase aerodynamics and fuel economy of the mini-platoon. Examples of vehicles with different powertrain types may include electric vehicles, compressed natural gas vehicles, fuel cell vehicles, hybrid vehicles, gasoline (direct injection) vehicles, gasoline (ported fuel) vehicles, gasoline (rich AV condition) vehicles, diesel vehicles, etc.

Grouping the vehicles in the mini-platoon by powertrain type and by size may improve cabin air quality in the host vehicle 100 since it reduces the likelihood that the host vehicle 100 will be stuck behind a vehicle with a different powertrain that outputs emissions with an unpleasant odor. Moreover, grouping vehicles by powertrain type and by size may improve cabin air quality in the host vehicle 100 since it reduces the likelihood that the host vehicle 100 will be located in the platoon behind a garbage truck, a vehicle transporting animals, a vehicle transporting mulch or fertilizer, etc. In some possible approaches, the platooning vehicles may be grouped according to emissions and odors output by the vehicles. By considering this factor, the host vehicle 100 is less likely to travel in the platoon behind a vehicle with a rich-running gasoline engine, a vehicle with a diesel engine, a vehicle emitting a disproportionate amount of smoke, a vehicle with a heavy smoker, etc.

The platooning system 105 may determine where the host vehicle 100 should be positioned in the mini-platoon based on various information such as the emissions of the host vehicle 100 (which may be measured directly or estimated by the powertrain type), whether the engine of the host vehicle 100 is "running rich," whether an air quality sensor located in the host vehicle 100 has detected abnormal odors, based on communications with other vehicles, whether the host vehicle 100 is operating in an autonomous mode, whether the host vehicle 100 has passengers, or possibly other factors. The platooning system 105 may identify where the host vehicle 100 should join a platoon (or mini-platoon) based on these or possibly other factors. When the host vehicle 100 is already traveling in a platoon, the platooning system 105 may command the host vehicle 100 to update its position in the platoon based on these or possibly other factors as conditions within the platoon (or mini-platoon) change. For instance, the platooning system 105 may command the host vehicle 100 to move to a different location in the platoon if, e.g., a vehicle with a different powertrain type or size enters the mini-platoon and begins giving off abnormal odors that reduce the air quality in the cabin of the host vehicle 100.

Although illustrated as a sedan, the host vehicle 100 may include any passenger or commercial automobile such as a car, a truck, a sport utility vehicle, a crossover vehicle, a van, a minivan, a taxi, a bus, etc. The host vehicle 100 is an autonomous vehicle that can operate in an autonomous (e.g., driverless) mode, a partially autonomous mode, and/or a non-autonomous mode. In some possible implementations, the platooning system 105 may command the host vehicle 100 to position itself according to powertrain type and vehicle size only when the host vehicle 100 has passengers. Thus, if the host vehicle 100 is operating in a fully autonomous mode, the platooning system 105 may simply enter the platoon at any location regardless of the emissions of the vehicles ahead of the host vehicle 100 in the platoon.

Figure 2:
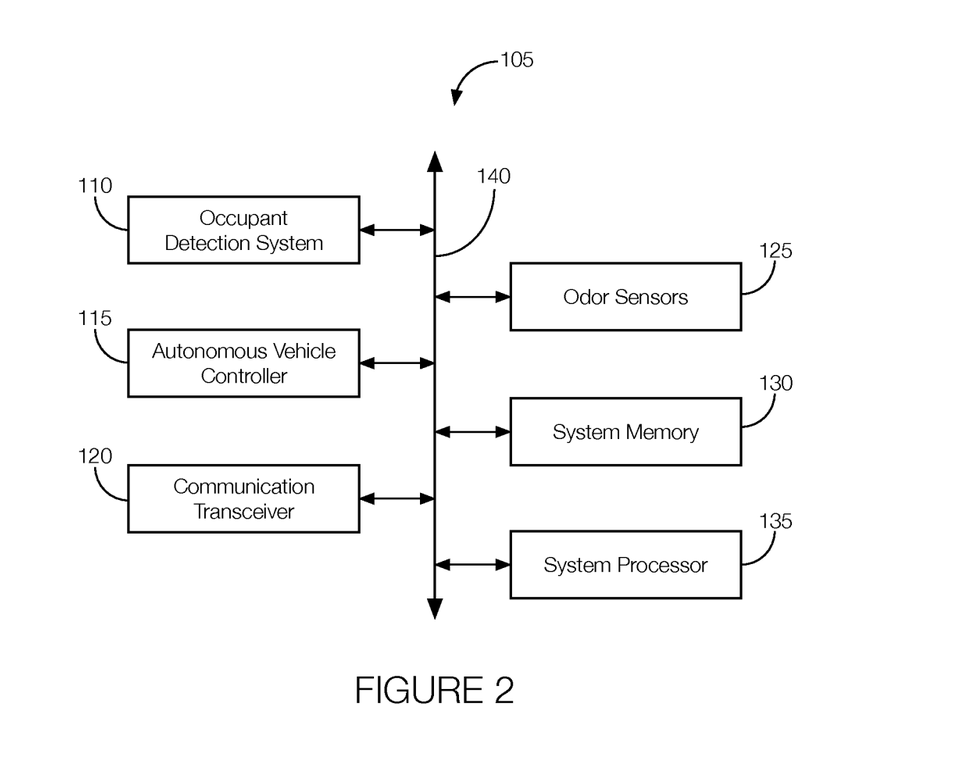
FIG. 2 is a block diagram of example components of the host vehicle, the platooning system, or both.

Referring now to FIG. 2, components of the platooning system 105 may include or communicate with components of the host vehicle 100 such as an occupant detection system 110 and an autonomous vehicle controller 115. The platooning system 105 may include a communication transceiver 120, odor sensors 125, a system memory 130, a system processor 135. Components of the platooning system 105, the host vehicle 100, or both, may communicate over a vehicle communication network 140 implemented using a communication protocol such as Ethernet, a Controller Area Network (CAN) bus, Bluetooth®, Bluetooth® Low Energy, etc.

The occupant detection system 110 is implemented via sensors, circuits, chips, or other electronic components that can detect occupants in the host vehicle 100. The occupant detection system 110 may include sensors located in one or more seats. The sensors of the occupant detection system 110 may output a signal when a person is detected in the seat. The sensors of the occupant detection system 110 may also or alternatively include one or more cameras, which could be an infrared camera, that can capture images of the interior of the host vehicle 100. The images may be processed to determine if, e.g., one or more passengers are present. The occupant detection system 110 may output a signal indicating whether passengers are present in the host vehicle 100, the number of passengers present, where the passengers are located in the host vehicle 100, etc.

The autonomous vehicle controller 115 may be a microprocessor-based controller implemented via circuits, chips, or other electronic components. For example, the controller may include a processor, memory, etc. The memory of the controller may include memory for storing instructions executable by the processor as well as for electronically storing data and/or databases. The autonomous vehicle controller 115 may be programmed to control various autonomous vehicle operations of the host vehicle 100. Examples of autonomous operations may include steering, braking, and acceleration of the host vehicle 100. The autonomous vehicle controller 115 may autonomously control the host vehicle 100 based on signals output by autonomous vehicle sensors, which may include lidar sensors, radar sensors, cameras, ultrasonic sensors, or the like. The autonomous vehicle controller 115 may autonomous control the host vehicle 100 by outputting command signals to various actuators that control the steering, braking, and acceleration of the host vehicle 100. Electrical control signals output by the autonomous vehicle controller 115 may be converted into mechanical motion by the actuator. The mechanical motion may cause the host vehicle 100 to move longitudinally, laterally, turn, accelerate, decelerate, etc. Examples of actuators may include a linear actuator, a servo motor, or the like.

The communication transceiver 120 is implemented via an antenna, circuits, chips, or other electronic components that facilitate wireless communication between the platooning system 105 and other vehicles. The communication transceiver 120 may be programmed to communicate in accordance with any number of wired or wireless communication protocols. For instance, the communication transceiver 120 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc. In some instances, the communication transceiver 120 is incorporated into a vehicle telematics unit.

The odor sensors 125 are implemented via circuits, chips, or other electronic components that can detect odors in the host vehicle 100, outside but near the host vehicle 100, or both. Examples of odors may include unpleasant smells such as unpleasant smells caused by vehicle emissions, garbage, animals, fertilizer, mulch, tobacco smoke, smoke from burning engine oil, other forms of smoke, etc. The odor sensors 125 may be implemented via air quality sensors that detect various gases, pollutants, particles, and volatile organic compounds known to cause unpleasant odors. Any number of odor sensors 125 may be located inside or outside the host vehicle 100. Each odor sensor 125 may be programmed to output a signal indicating the presence of an unpleasant odor in or near the host vehicle 100.

The system memory 130 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The system memory 130 may store instructions executable by the system processor 135 and data such as the outputs of the odor sensors 125, the output of the occupant detection system 110, the powertrain type of the host vehicle 100, the size or class of the host vehicle 100, the emissions of the host vehicle 100, emissions data received from other vehicles, etc. The instructions and data stored in the system memory 130 may be accessible to the system processor 135 and possibly other components of the platooning system 105, the host vehicle 100, or both.

The system processor 135 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The system processor 135 is programmed to determine, from the data stored in the system memory 130 and output by the odor sensors 125 and the occupant detection system 110, where the host vehicle 100 should be located in a vehicle platoon, a mini-platoon, or both.

For instance, the system processor 135 may be programmed to determine whether the host vehicle 100 should join or establish a vehicle platoon. The system processor 135 may be programmed to identify nearby platooning vehicles with similar emissions based on powertrain type. The system processor 135 may be programmed to establish the mini-platoon by communicating with the nearby vehicles with a similar powertrain type and requesting that the vehicles with the similar powertrain type join the mini-platoon.

The system processor 135 may be further programmed to order the mini-platoon to travel in the larger vehicle platoon at a particular location relative to other mini-platoons. The system processor 135 may order the mini-platoon to a location according to the powertrain type of the vehicles in the mini-platoon. The order of the mini-platoons may be as follows. The mini-platoon at the front of the vehicle platoon may include electric vehicles, compressed natural gas vehicles, and fuel cell vehicles. The next mini-platoon may include hybrid vehicles. The next mini-platoon after hybrid vehicles may include various vehicles running on gasoline. In order, they may be formed into different mini-platoons for gasoline (direct injection) vehicles, gasoline (ported fuel) vehicles, and gasoline (rich AV condition) vehicles. The next mini-platoon may include diesel vehicles. In areas where diesel vehicles are more common, the mini-platoon with diesel vehicles may be ahead of the mini-platoon with gasoline powered vehicles since, in those areas, the smell of a gasoline vehicle may be more unpleasant than the smell of a diesel vehicle. Other mini-platoons may be established using different criteria than powertrain type. For instance, vehicles giving off unpleasant odors unrelated to the powertrain type may be separated into one or more mini-platoons. Thus, vehicles burning oil, vehicles with smokers, trucks transporting garbage, animals, fertilizer, or mulch, etc., may be grouped into their own mini-platoons. These mini-platoons may be located near the end of the platoon (e.g., after gasoline vehicles and diesel vehicles).

With the other vehicles in the mini-platoon established, the system processor 135 may further determine where in the mini-platoon the host vehicle 100 should be located. The system processor 135 may be programmed to make such a decision based on, e.g., the size or class of the host vehicle 100 relative to the other vehicles in the mini-platoon. In one possible implementation, smaller vehicles may be positioned near the front of the mini-platoon and larger vehicles may be positioned near the back of the mini-platoon. Thus, the system processor 135 may be programmed to determine where the host vehicle 100 should be located based on, e.g., whether the host vehicle 100 is larger or smaller than other vehicles in the mini-platoon.

In some instances, the system processor 135 may be programmed to have the host vehicle 100 join a mini-platoon if the host vehicle 100 is occupied with one or more passengers. The system processor 135 may be programmed to make such a decision based on the output of the occupant detection system 110. If the host vehicle 100 is unoccupied, the system processor 135 may command the host vehicle 100 to join the platoon without joining a mini-platoon. In this circumstance, the system processor 135 may command the host vehicle 100 to join the back of the platoon or anywhere else appropriate for joining the platoon without contributing unpleasant odors to vehicles in the platoon that may have occupants. Alternatively, if the host vehicle 100 is unoccupied, the system processor 135 may command the host vehicle 100 to join a mini-platoon either according to the criteria above or at the request of another vehicle in the mini-platoon, in which case the system processor 135 may be programmed to determine where to join the mini-platoon according to the size considerations discussed above.

Figure 3:
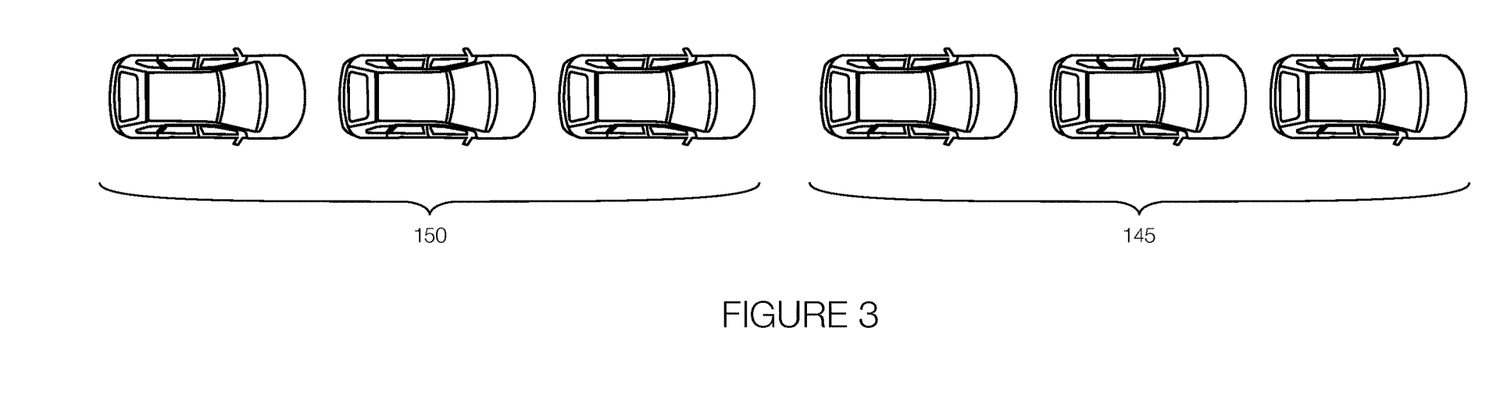
FIG. 3 illustrates a group of vehicles in a platoon arranged by powertrain type.

FIG. 3 illustrates a group of vehicles in a platoon arranged in mini-platoons by powertrain type. A first mini-platoon 145 includes vehicles with a similar powertrain type, emissions, or both. For example, the vehicles in the first mini-platoon 145 may be, e.g., electric vehicles. A second mini-platoon 150 includes vehicles with a similar powertrain type, emissions, or both. The vehicles in the second mini-platoon 150 may be, e.g., hybrid vehicles. By establishing such mini-platoons, vehicles with similar powertrain types, emissions, or both, may be grouped together. Although each mini-platoon is shown with three vehicles, the mini-platoons may be established with any number of vehicles.

Figure 4:
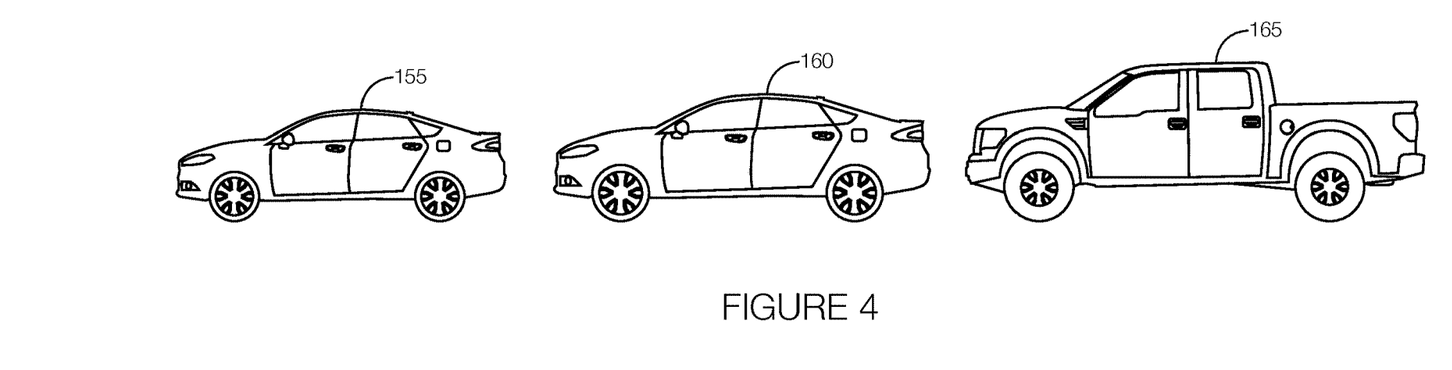
FIG. 4 illustrates a platoon formed of mini-platoons where vehicles are grouped by powertrain type and ordered by vehicle size or class.

FIG. 4 illustrates an example mini-platoon with three vehicles of different sizes. As shown, the mini-platoon includes a compact sedan 155, a mid-size sedan 160, and a pickup truck 165. These vehicles are grouped in the mini-platoon because they have the same powertrain type (e.g., a direct injection gasoline engine). Placing the smaller vehicles, such as the compact sedan 155, near the front of the mini-platoon and the larger vehicles, such as the pickup truck 165, near the back of the mini-platoon may make the mini-platoon more aerodynamic when traveling. Improving the aerodynamics of the mini-platoon may make the mini-platoon more fuel efficient.

Figure 5:
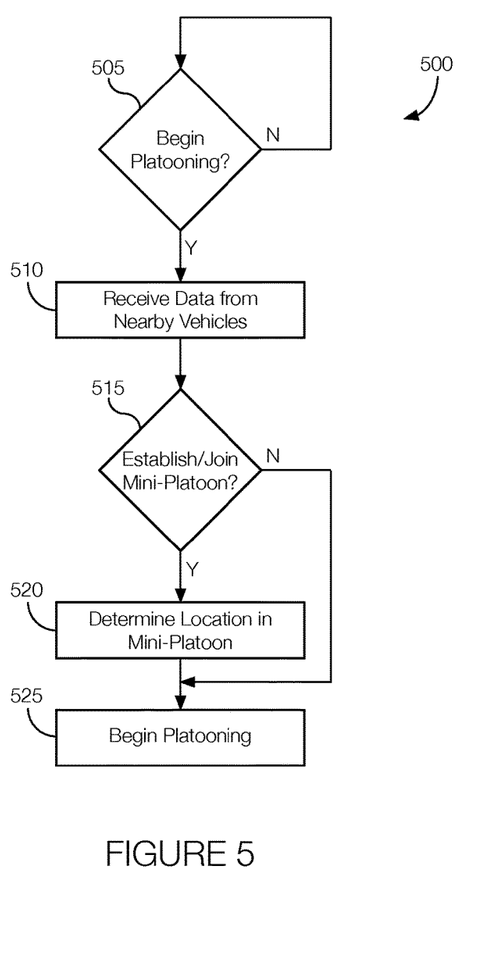
FIG. 5 is a flowchart of an example process that may be executed by the platooning system to determine whether to join a platoon.

FIG. 5 illustrates a flowchart of an example process 500 that may be executed by the platooning system 105 of the host vehicle 100. The process 500 may begin at any time while the host vehicle 100 is operating, such as when the host vehicle 100 is seeking to join a platoon. The process 500 may be executed when the host vehicle 100 is operating in an autonomous mode, including an autonomous platooning mode (i.e., the host vehicle 100 is operating autonomously while seeking to join the platoon and continuing to operate autonomously while traveling in the platoon).

At decision block 505, the platooning system 105 determines whether to begin operating in a platooning mode (e.g., controlling the host vehicle 100 in a platoon). The system processor 135 may determine that it is time to begin operating in the platooning mode based on a user input from, e.g., a vehicle driver or other passenger or at some time when the host vehicle 100 is operating in an autonomous mode. The process 500 may proceed to block 510 if the system processor 135 decides that the host vehicle 100 is ready to operate in a platoon. Otherwise, block 505 may repeat until the platooning system 105 is ready to begin platooning.

At block 510, the platooning system 105 receives data from nearby vehicles. The data may be received by the communication transceiver 120 and processed by the system processor 135. The data may include data about the powertrains of the nearby vehicles, emissions of the nearby vehicles, size or class of the nearby vehicles, etc. As discussed above, the system processor 135 may use the data received from the nearby vehicles to determine whether to establish or join a mini-platoon.

At decision block 515, the platooning system 105 determines whether to establish or join a mini-platoon. The system processor 135 may determine whether to establish or join the mini-platoon based on various factors including, e.g., whether the host vehicle 100 is occupied and the data received at block 510. For instance, the system processor 135 may decide to establish or join a mini-platoon if the host vehicle 100 has passengers, if there are other vehicles in the platoon with the same (or similar) powertrain type or emissions as the host vehicle 100, if the other vehicles with the same or similar powertrain type or emission are already platooning (including in a mini-platoon), etc. If the system processor 135 decides to establish or join the mini-platoon (i.e., there are other vehicles with the same or similar powertrain type or emissions nearby, the host vehicle 100 has passengers, etc.), the process 500 may proceed to block 520. Otherwise, the process 500 may proceed to block 525. In some possible implementations, the process 600, described below with reference to FIG. 6, may be executed as part of the execution of block 515.

At block 520, the platooning system 105 determines the location of the host vehicle 100 in the mini-platoon. The system processor 135 may compare the size or class of the host vehicle 100 to the sizes and classes of the other vehicles with the same or similar powertrain type or emissions. The system processor 135 may determine the sizes and classes of the other vehicles from the data received at block 510. The system processor 135 may determine that the host vehicle 100 should be behind a vehicle that is the same size or smaller than the host vehicle 100 and in front of a vehicle that is the same size or larger than the host vehicle 100 in the mini-platoon. The system processor 135 may command the communication transceiver 120 to send messages to the other vehicles to coordinate the order of the vehicles, including the host vehicle 100, in the mini-platoon.

At block 525, the platooning system 105 is ready for the host vehicle 100 to begin platooning. If the process 500 arrives at block 525 via block 520, the system processor 135 may command the autonomous vehicle controller 115 to move to the location in the mini-platoon determined at block 520. If the process 500 arrives at block 525 via block 515, the system processor 135 may command the autonomous vehicle controller 115 to begin operating in the platoon at any location where it is convenient for the host vehicle 100 to enter the platoon.

The process 500 may continue with block 525 until, e.g., the host vehicle 100 no longer operates in the platoon. Certain blocks, such as blocks 510-525 may be repeated if, e.g., another vehicle seeks to join the mini-platoon. The process 500 may end when platooning of the host vehicle 100 is no longer desired, either by the occupants of the host vehicle 100 or by decision of the autonomous vehicle controller 115.

Figure 6:
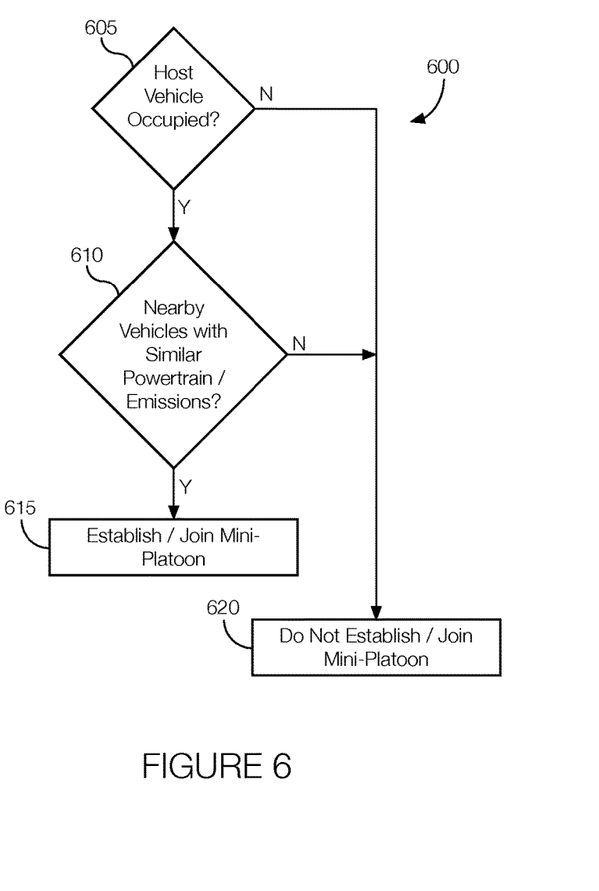
FIG. 6 is a flowchart of an example process that may be executed by the platooning system to determine whether to establish or join a mini-platoon.

FIG. 6 illustrates a flowchart of an example process 600 that may be executed by the platooning system 105 of the host vehicle 100 to determine whether to establish or join a mini-platoon. For instance, the process 600 may begin when the process 500 reaches block 515.

At decision block 605, the platooning system 105 determines if the host vehicle 100 is occupied. That is, the system processor 135 may determine that the host vehicle 100 is occupied based on signals output by the occupant detection system 110. If the host vehicle 100 has passengers, the process 600 may proceed to block 620. If the system processor 135 determines that the host vehicle 100 has one or more passengers, the process 600 may proceed to block 610.

At decision block 610, the platooning system 105 determines if nearby vehicles with the same or similar powertrain types or emissions are present. The system processor 135 may make such a determination by processing the data received from the nearby vehicles at block 510 of the process 500 shown with respect to FIG. 5. If the system processor 135 detects nearby vehicles with the same or similar powertrain types or emissions, the process 600 may proceed to block 615. If the system processor 135 determines that there are no nearby vehicles with the same or similar powertrain types or emissions, the process 600 may proceed to block 620.

At block 615, the platooning system 105 may establish or join a mini-platoon. That is, the system processor 135 may command the autonomous vehicle controller 115 to join an already-established mini-platoon that includes vehicles of the same or similar powertrain type or emissions as that of the host vehicle 100. If no such mini-platoon already exists, the system processor 135 may command the communication transceiver 120 to send messages to the other vehicles with the same or similar powertrain type or emissions to arrange establishing a mini-platoon. The system processor 135 may command the autonomous vehicle controller 115 to join the mini-platoon with those vehicles. In some instances, arriving at block 615 may result in the process 500 proceeding from block 515 to block 520.

At block 620, the platooning system 105 may not establish or join a mini-platoon. In some possible implementations, arriving at block 620 may include the process 500 proceeding from block 515 to block 525. Thus, the system processor 135 deciding not to establish or join a mini-platoon may include the system processor 135 commanding the autonomous vehicle controller 115 to join the platoon at any location convenient for the host vehicle 100.

The process 600 may end after block 615 or 620.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system for a host vehicle comprising:
a communications transceiver programmed to communicate according to a wireless communication protocol;
a plurality of actuators that convert electrical control signals into mechanical motion of the host vehicle;
a memory; and
a processor programmed to execute instructions stored in the memory, the instructions including instructions to command the actuators to operate a host vehicle in a mini-platoon based at least in part on data received in the communications transceiver from one or more second vehicles specifying a powertrain type of the one or more second vehicles, wherein the mini-platoon comprises a plurality of vehicles including the host vehicle and is one of a plurality of mini-platoons that form a platoon, wherein the powertrain type specifies a type of fuel provided to power vehicle motion.

2. The system of claim 1, wherein the processor is programmed to determine a location of the host vehicle in the mini-platoon relative to at least one of the plurality of nearby vehicles.

3. The system of claim 2, wherein the location is based at least in part on at least one of a size and class of the host vehicle and at least one of a size and class of at least one of the plurality of nearby vehicles.

4. The system of claim 1, wherein the data received from the one or more nearby vehicles includes at least one of the respective sizes and classes of the one or more nearby vehicles.

5. The system of claim 1, wherein the data received in the communications transceiver from one or more second vehicles further specifies emissions.

6. The system of claim 1, wherein the processor is programmed to determine whether the host vehicle has at least one passenger.

7. The system of claim 6, wherein the processor is programmed to determine whether the host vehicle has at least one passenger based on signals output by an occupant detection system.

8. The system of claim 1, further comprising an autonomous vehicle controller programmed to autonomously operate the host vehicle in the mini-platoon.

9. A method comprising:
receiving data in a host vehicle from a nearby vehicle in a communications transceiver programmed to communicate according to a wireless communication protocol;
detecting the nearby vehicle has a same powertrain type as a host vehicle from data in a communication received from the nearby vehicle in the wireless communications transceiver; and
actuating the vehicle to operate the host vehicle in a mini-platoon with the nearby vehicle after determining that the nearby vehicle has at least the powertrain type of the powertrain type of the host vehicle, wherein the mini-platoon comprises a plurality of vehicles including the host vehicle and the nearby vehicle and is one of a plurality of mini-platoons that form a platoon, wherein the powertrain type specifies a type of fuel provided to power vehicle motion.

10. The method of claim 9, further comprising determining a location of the host vehicle in the mini-platoon relative to the nearby vehicle.

11. The method of claim 10, wherein the location is based at least in part on at least one of a size and class of the host vehicle and at least one of a size and class of the nearby vehicle.

12. The method of claim 9, wherein the data received from the nearby vehicle includes at least one of the size and class of the nearby vehicle.

13. The method of claim 9, wherein the data received in the communications transceiver from one or more second vehicles further specifies emissions.

14. The method of claim 9, further comprising determining that the host vehicle has at least one passenger.

15. The method of claim 14, wherein determining that the host vehicle has at least one passenger includes:
receiving a signal output by an occupant detection system; and
determining that the host vehicle has at least one passenger by processing the signal output by the occupant detection system.

16. The method of claim 14, wherein operating the host vehicle in a mini-platoon with the nearby vehicle occurs after determining that the host vehicle has at least one passenger.

17. The method of claim 14, wherein determining that the nearby vehicle has at least one of the powertrain type and emissions similar to the powertrain type or emissions of the host vehicle occurs after determining that the host vehicle has at least one passenger.

* * * * *